Sheet 1 - 3 Sheets.

Goodes & Miller.

Sewing Machine.

No. 1616 Reissued Feb. 9, 1864.

Witnesses.

Charles Offner
H. Albert Steil

Inventors.

Henry Goodes
Abel F. L. Miller & J. Roberts
per attorney

Goodes & Miller.

Sewing Machine.

No 1616

Reissued Feb. 9, 1864.

Witnesses.

Charles C. Foster
H. Albert Steel

Inventor.

Henry Howson
Atty for Allen & Patterson
2 Attys

Goodes & Miller.
Sewing Machine.
No 1616
Reissued Feb. 9, 1864.
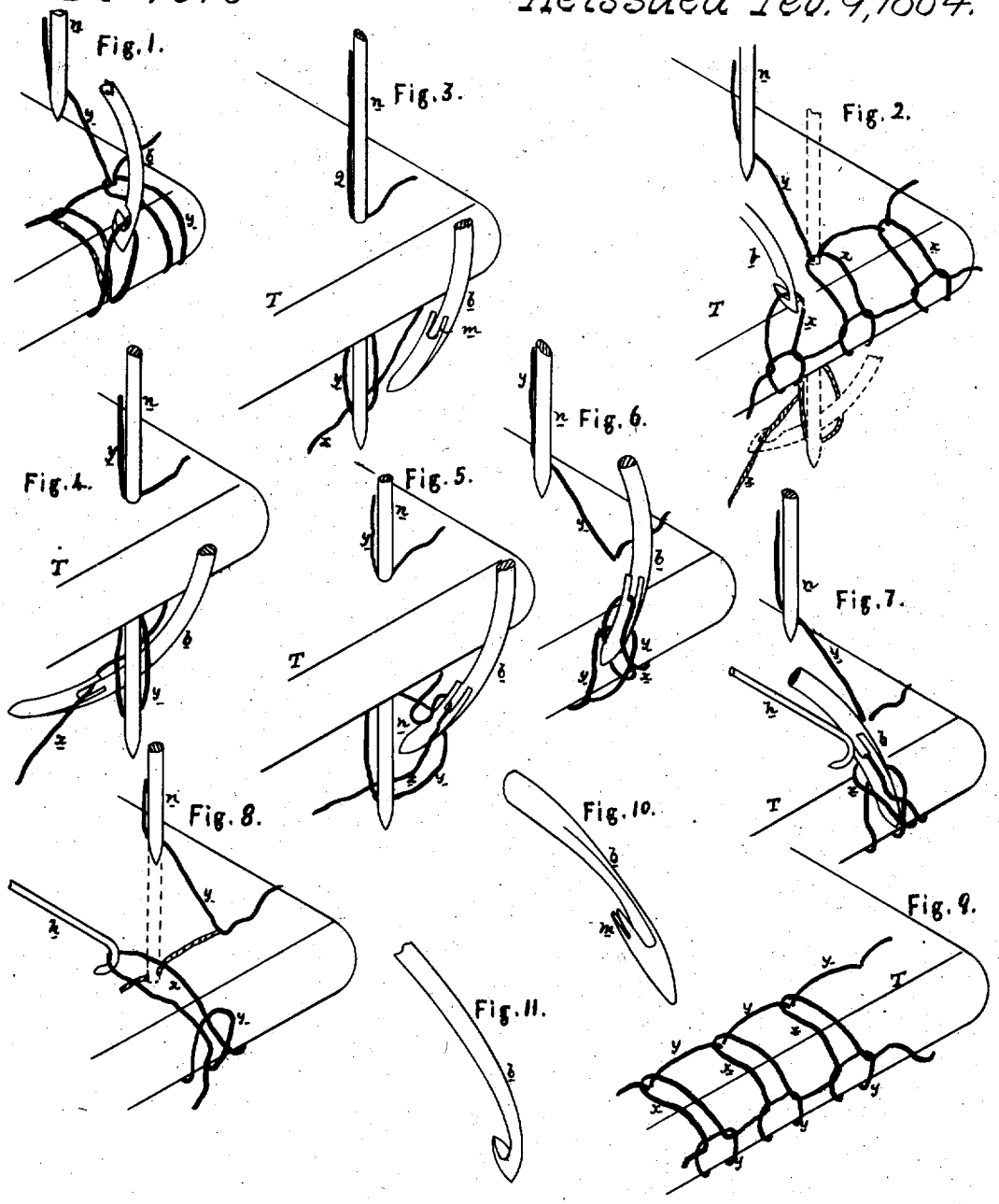
Witnesses.
Charles E. Foster
W. Albert Steel.
Inventors.
Henry Howden
Asa F. Patterson
Phineas E. Miller

UNITED STATES PATENT OFFICE.

C. S. PATTERSON, E. PINCUS, A. HART, M. MOORE, A. MITCHELL, AND H. H. REED, ASSIGNEES OF E. A. GOODES AND E. L. MILLER, OF PHILADELPHIA, PENNSYLVANIA.

IMPROVEMENT IN SEWING-MACHINES.

Specification forming part of Letters Patent No. 24,863, dated July 26, 1859; Reissue No. 1,616, dated February 9, 1864.

*To all whom it may concern:*

Be it known that we, C. S. PATTERSON, E. PINCUS, A. HART, M. MOORE, A. MITCHELL, and H. H. REED, have become the owners of certain Letters Patent for an Improvement in Sewing-Machines granted to E. A. Goodes and E. L. Miller on the 26th day of July, A. D. 1859, which Letters Patent we deem inoperative and invalid by reason of a defective and insufficient specification; and we do hereby declare the following to be a full, clear, and exact description of the same, reference being had to the accompanying drawings, and to the letters of reference marked thereon.

The invention of the said Goodes and Miller consists, first, of a needle or loop-catcher so constructed, so arranged on a sewing-machine, and having such a movement that it will hold a loop of thread and convey the same from the under side of the fabric and upward across the edge of the same; secondly, in the combination of the said needle or loop-catcher with an eye-pointed needle and a hook or its equivalent; thirdly, in the combination of the said eye-pointed needle, the said loop-catcher or needle, the hook, and an elastic tongue.

The above devices, which are fully described hereinafter, have been designed for forming a stitch over the edge of a fabric, or a buttonhole stitch, with one or two threads, substantially in the manner described hereinafter.

In order to enable others skilled in the art to make and use the said invention, we will now proceed to describe the manner of carrying it into effect.

Figure 1:
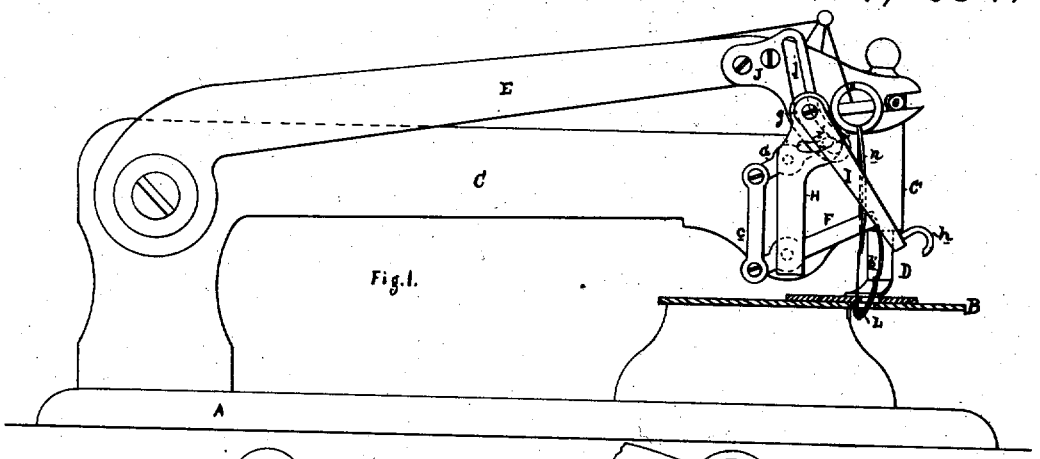
Figure 3:
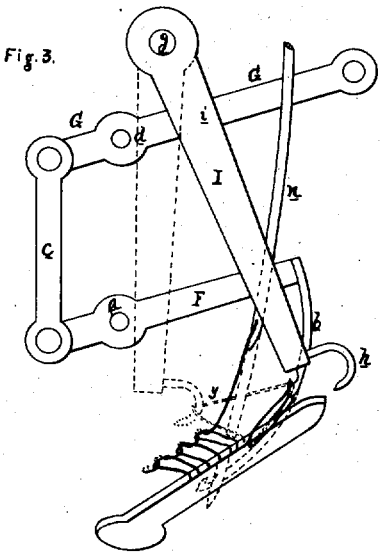
Figure 4:
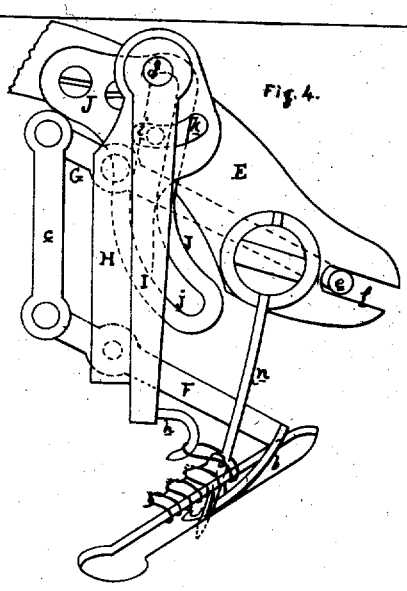
Figure 5:
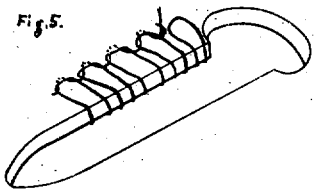
Figure 6:
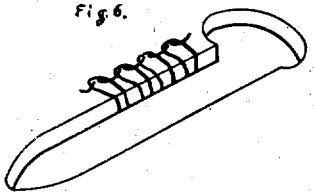
Figure 2:
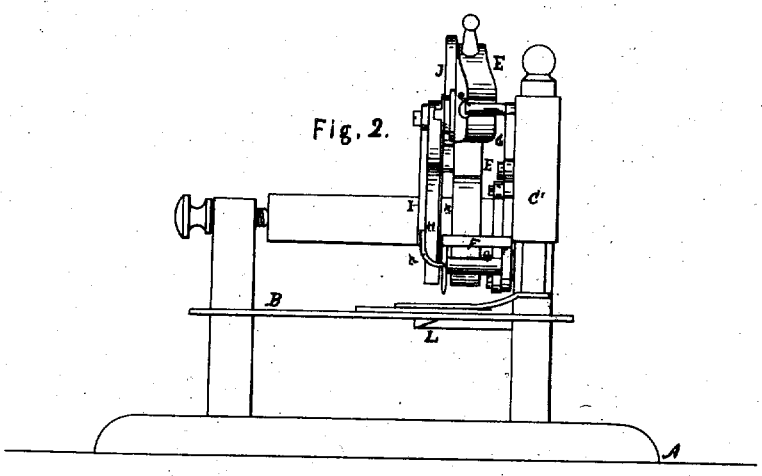
Figure 7:
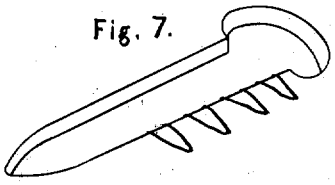
Figure 8:
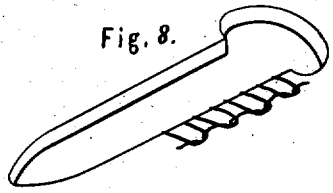

On reference to the accompanying drawing No. 1, which forms a part of this specification, Figure 1 is a side view of sufficient of a sewing-machine to illustrate the invention; Fig. 2, a front view of the same. Figs. 3 and 4 are diagrams drawn to an enlarged scale, and illustrating the operation of the parts by which the stitches are formed. Fig. 5 illustrates the stitch as formed by the machine from a single thread; Fig. 6, the stitch as formed by the machine from two threads; Fig. 7, the stitch Fig. 5 as it appears on the under side of the fabric; Fig. 8, the stitch Fig. 6 as it appears on the under side of the fabric; and Fig. 9, a view of a tongue which may be used on the under side of the work-plate, for a purpose described hereinafter.

Figure 9:
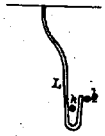

Drawing No. 2 illustrates by means of diagrams the method of forming the stitch, Fig. 1 showing the forming of the stitch from one thread; Fig. 2, the method of forming the stitch from two threads with the aid of the same loop-catcher employed in making the single-thread stitch. Figs. 3, 4, 5, 6, 7, and 8 also illustrate the mode of forming the stitch from two threads with the aid of a loop-catcher having a recessed barb; Fig. 9, the two-threaded stitch complete, and Figs. 10 and 11 views of the loop-catchers or needles.

A represents the base-plate of the machine; B, the work-plate; C, the stationary arm; D, the pressure-pad; E, the needle-arm, and *n* the ordinary needle, all these parts being constructed in a manner too well known to those familiar with sewing-machines to need description.

F is a lever hung to a stud, *a*, secured to the stationary arm C, and having at its end a hooked loop-catcher, *b*, forming the segment of a circle of which the stud *a* is the center. The short arm of the lever F is connected by a link, *c*, to the short arm of the lever G, which has its fulcrum on a pin, *d*, secured to the stationary arm C, the long arm of this lever carrying a pin, *e*, which projects into a slot, *f*, in the end of the needle-arm E.

H is a plate permanently secured in the present instance to the stud *a*, and to a pin, *g*, secured to the upper end of this plate, is hung an arm, I, the lower end of which is furnished with a hook, *h*. A pin, *i*, secured to the arm I, projects through a curved slot, *k*, in the plate H, and through another curved slot, *j*, in a plate, J, attached to the needle-arm E.

On imparting a vibrating motion to the needle-arm E the following movements of the above-described parts will take place: first, the motion of the eye-pointed needle *n*, which passes through an opening in the work-plate B; second, the vibrating motion of the lever F and its loop-catcher *b*, which also passes through an opening in the plate B, this motion being communicated to the looper from the needle-arm through the lever G and link *c*; third, the vibrating motion of the arm I, caused by its pin *i* being acted upon by the edges of the curved slot *j* in the plate J, attached to the needle-arm.

It should be understood that the loop catcher *b* ascends and descends simultaneously with the eye-pointed needle *n*, that the loop-catcher, with its hook, moves closely or in contact with the needle *n*, that the hook *h* vibrates in the arc of a circle immediately above the fabric on the work-plate and close to the needle *n*. The vibrating motion of this hook is intermittent, owing to the form of the slot *j*, the hook advancing quickly as the needle *n* completes its ascent, retiring quickly as the said needle commences its descent, and remaining stationary during the greater portion of the operation of the needle *n* and loop-catcher *b*.

When a single thread is used the operation of sewing is accomplished in the following manner, the thread being supplied from a spool and passing through the eye of the needle *n*, as in other sewing-machines: The fabric to be operated on is placed on the work-plate B in such a position that the edge of the button-hole or other edge to be sewed over shall project a short distance in front of the path of the needle *n*, and so that the loop-catcher *b* shall pass in front of the edge of the fabric, as seen in Fig. 4 in Drawing No. 1, and pass the needle *n* below the work-plate. As the needle *n*, after reaching the limit of its downward movement, commences to return, it leaves the thread slackened and in the form of a loop beneath the fabric. As the loop-catcher *b* returns simultaneously with the needle *n*, its hook catches the loop of thread and draws it up past the edge of the fabric, while the needle *n* and thread are drawn up from the fabric. The hook *h* suddenly advances to the position shown in Fig. 3, as the needle and looper complete their upward movement, in order that it may catch and retire with one side of the loop (see red dotted lines, Fig. 3) as the needle commences to descend again, and thus hold the loop in such a position that the needle *n*, with its thread, may pass through it. As the loop-catcher or needle *b* carries the loop upward, and the hook *h* is about to seize the loop, there may be a tendency of the loop to escape prematurely from the barb of the loop-catcher. In order to obviate this, the elastic tongue L, Fig. 9, Drawing No. 1, may be arranged in such a position under the work-plate that the needle-thread shall be drawn partly round the point of the tongue as both needle and loop-catcher begin to rise, the point of the tongue retaining the loop within the barb of the loop-catcher until it is necessary to be released from the same, and the tongue being sufficiently elastic and its point so formed that this release of the loop takes place at the proper time. Every loop is operated upon in succession, in the manner described, by the loop-catcher *b* and the hook *h*—that is to say, the loop is folded up over the edge of the fabric to the side where it entered, and on that side has its successor passed through it. In other words, the stitch is formed on the edge of the fabric by folding loops of thread over the said edge, and interlocking the loops with each other and to the fabric by the same thread, thus forming the stitch represented in Fig. 5, the form of the stitch on the under side of the fabric being shown in Fig. 7, Drawing No. 1, a more distinct view of the manner of forming this single-threaded stich being represented in Fig. 1, Drawing No. 2. It will be evident, however, to those familiar with the construction and operation of sewing-machines that two threads may be used. For instance, an under thread may be supplied from a spool, and be so guided that the loop-catcher *b* will draw it through the loop of needle-thread and over the edge of the fabric, to be there locked by the loops of needle-thread to the fabric in precisely the same manner as in the formation of the single-threaded stitch. This manner of forming the double-threaded stitch is illustrated in Fig. 2, Drawing No. 2, on reference to which it will be observed that the loop of the under thread, *x*, is drawn through the loop of the needle-thread *y* and upward across the edge of the fabric. This plan of drawing the loop of under thread through that of the needle-thread, or, in other words, interlocking the loops with each other, can be accomplished in the manner illustrated by Figs. 3, 4, 5, 6, 7, and 8, Drawing No. 2, which I will now proceed to describe.

The loop-catcher or needle *b* has what may be termed a "second" hook; or, rather, a recess, *m*, is formed in the end of the barb of the hook of the loop-catcher, this hook, with the recessed barb, being clearly shown in the above-enumerated figures.

In Fig. 8, Drawing No. 2, the needle *n* has penetrated the fabric T, and a loop of needle-thread is formed beneath the same, and the loop-catcher *b*, with its recessed barb moving in the arc of a circle, is in the act of descending toward the position shown in Fig. 4, which is the extreme limit of its downward movement. The under thread, *x*, is so guided that on the return movement of the loop-catcher it will take its place in the recess *m* of the barb, and the barb itself will catch the loop of needle-thread, which, as the loop-catcher continues to rise, will cross the loop of under thread, as seen in Fig. 5. The two loops are now drawn upward, the loop of under thread in advance of that of the needle-thread. (See Fig. 6.) The hook *h* then advances, as seen in Fig. 7, and catches the more prominent loop of under thread, draws it back, and holds it in a position to be penetrated by the needle and its thread. (See Fig. 8.) The needle *n* now descends through the loop of under thread, *x*, which is thus secured to the fabric by the loop of upper thread carried down by the needle. At the same time the loop-catcher moves downward, disengaging itself from both the loop of under thread, *x*, and loop of needle-thread *y*, the hook *h* now moving forward sufficiently to disengage itself from the loop of thread *x*. The needle *n* then ascends, and the different parts of the machine resume their first positions, preparatory to the formation of the next stitch.

It will be seen from the foregoing description that the loop of under thread is drawn through that of the needle-thread by causing the latter to cross the former, as seen in Fig. 5, and that a stitch, Fig. 7, of a character precisely similar to that shown in Fig. 2 is produced. It will also be seen that the two-threaded stitch may be termed a "duplicate" of the single-threaded stitch.

As the arrangement of the parts described depends in a great measure upon the style of machine to which they have to be applied, we do not desire to confine ourselves to the precise arrangement of mechanism specified; but

We claim as the invention of the said Goodes and Miller—

1. The loop-catcher or needle *b*, so constructed, so arranged on a sewing-machine, and having such a motion imparted to it that it will hold a loop of thread and convey the same from the under side of the fabric and across the edge of the same, as set forth.

2. The combination of the needle or loop-catcher *b*, the eye-pointed needle *n*, and the hook *h*, or its equivalent, the whole being arranged for joint action, substantially as and for the purpose set forth.

3. The combination of the eye-pointed needle *n*, the needle or loop-catcher *b*, the hook *h*, and tongue L.

In testimony whereof we have signed our names to this specification before two subscribing witnesses.

E. PINCUS.
A. HART.
MARMADUKE MOORE.
ALLEN MITCHELL.
HENRY H. REED.
C. S. PATTERSON.

Witnesses to the signatures of E. Pincus, A. Hart, Marmaduke Moore, Allen Mitchell, and Henry H. Reed:

HENRY HOWSON,
CHAS. HOWSON.

Witnesses to the signature of C. S. Patterson:

WM. H. MASON,
EDW. A. HASTY.